United States Patent [19]

Tomizawa

[11] 4,393,420
[45] Jul. 12, 1983

[54] TAPE RUN SPEED-CHANGING CIRCUIT

[75] Inventor: Yoshio Tomizawa, Tama, Japan

[73] Assignee: Olympus Optical Co., Ltd., Tokyo, Japan

[21] Appl. No.: 160,085

[22] Filed: Jun. 16, 1980

[30] Foreign Application Priority Data

Jun. 26, 1979 [JP] Japan .................................. 54-80333

[51] Int. Cl.³ ............................................ G11B 15/44
[52] U.S. Cl. .................................................... 360/73
[58] Field of Search .......................................... 360/73

[56] References Cited

U.S. PATENT DOCUMENTS 4,124,873 11/1978 Satoh et al. ............................ 360/73
4,206,486 6/1980 Satoh et al. ............................ 360/73

Primary Examiner—Robert S. Tupper
Attorney, Agent, or Firm—Frishauf, Holtz, Goodman & Woodward

[57] ABSTRACT

A tape run speed-changing circuit which comprises a motor driven at a speed conforming to any tape run speed for the recording or playback mode and also at a speed matching any tape run speed for the cue or review mode, a first tape run speed-changing device for specifying any tape run speed for the cue or review mode, and a second tape run speed-changing device which selects any tape run speed for the recording or playback mode and whose operation mode is changed over interlockingly with that of the first tape run speed-changing device. When the second tape run speed-changing means device specifies a first tape run speed for the recording or playback mode, then the first tape run speed-changing means device selects a first tape run speed for the cue or review mode; and when the second tape run speed-changing device specifies a second tape run speed for the recording or playback mode, then the first tape run speed-changing device selects a second tape run speed for the cue or review mode.

5 Claims, 3 Drawing Figures

TAPE RUN SPEED-CHANGING CIRCUIT

BACKGROUND OF THE INVENTION

This invention relates to a tape run speed-changing circuit adapted to be used with a multispeed type tape recorder having cue and review functions.

A tape recorder used in place of a written memorandum offers great advantages, if provided with cue and review functions. The term "cue" denotes an operator's action of effecting the fast forward (FF) mode of a magnetic tape, while listening to the sounds produced from a tape. The term "review" represents an operator's action of carrying out the rewind (RW) mode of the magnetic tape, while listening to the sounds produced from the tape. The cue and review modes of the tape recorder are used to check the contents of data recorded in the tape. Since the operator carries out the cue and review modes to quickly check the contents of the tape while listening to said contents reproduced from the tape, the tape should naturally run at a proper speed. In other words, if the tape travels too slowly, then the check of the recorded data consumes a considerably long time. Conversely where the tape run is unduly fast, it is impossible for the operator to distinctly hear the reproduced sounds. The speed at which the tape runs for the cue or review mode should be properly changed in accordance with the speed at which the tape originally travelled for the recording mode, for instance. Now let it be assumed that data was recorded on a tape, while it was run at a speed of 2.4 cm/s, and there is provided a tape recorder which is so designed as to cause a tape to travel for the cue or review mode at a speed conforming to the above-mentioned recording speed of 2.4 cm/s. Where it is attempted to check data recorded in a tape at a tape run speed of 1.2 cm/s by means of the aforesaid fast tape run type tape recorder at the cue or review mode, then the tape run is so fast that the operator has considerable difficulties in hearing sounds reproduced from said 1.2 cm/s recorded type tape. Conversely where it is attempted to check sounds recorded in a tape at a tape run speed of 2.4 cm/s by means of a tape recorder which is designed to cause a tape to travel for the cue or review mode at a speed of 1.2 cm/s, then recorded sounds are checked with an exceedingly low efficiency.

SUMMARY OF THE INVENTION

This invention has been accomplished in view of the above-mentioned circumstances, and is intended to provide a tape run speed-changing circuit which enables a tape run speed for the cue or review mode to be changed in accordance with the speed at which a tape originally travelled for the recording or playback mode by a tape recorder.

To this end, the present invention provides a tape run speed-changing circuit which comprises a means for changing a tape run speed for the cue or review mode in accordance with the original tape run speed for the recording or playback mode. Specifically, when an optimum tape run speed for the cue or review mode is chosen to be 4.8 cm/s, with respect to a tape which was run at a speed of 1.2 cm/s for recording, then the tape run speed-changing circuit of this invention comprises a means for changing a tape run speed for the cue or review mode to 9.5 cm/s with respect to a tape which travelled at a speed of 2.4 cm/s for recording. Provision of such tape run speed-changing circuit always enables a tape to run at a proper speed for the cue or review mode with respect to a tape in which data was recorded at a tape run speed of 1.2 or 2.4 cm/s.

DETAILED DESCRIPTION OF THE PREFERRED EMBODIMENT

Description is now given with reference to the accompanying drawings of a tape run speed-changing circuit embodying this invention. The same or similar parts are denoted by the same numerals throughout the drawings, description thereof being omitted. The parts represented by the same numerals may be exchanged for each other directly or with minor modification which is easy for one skilled in the art.

Figure 1:
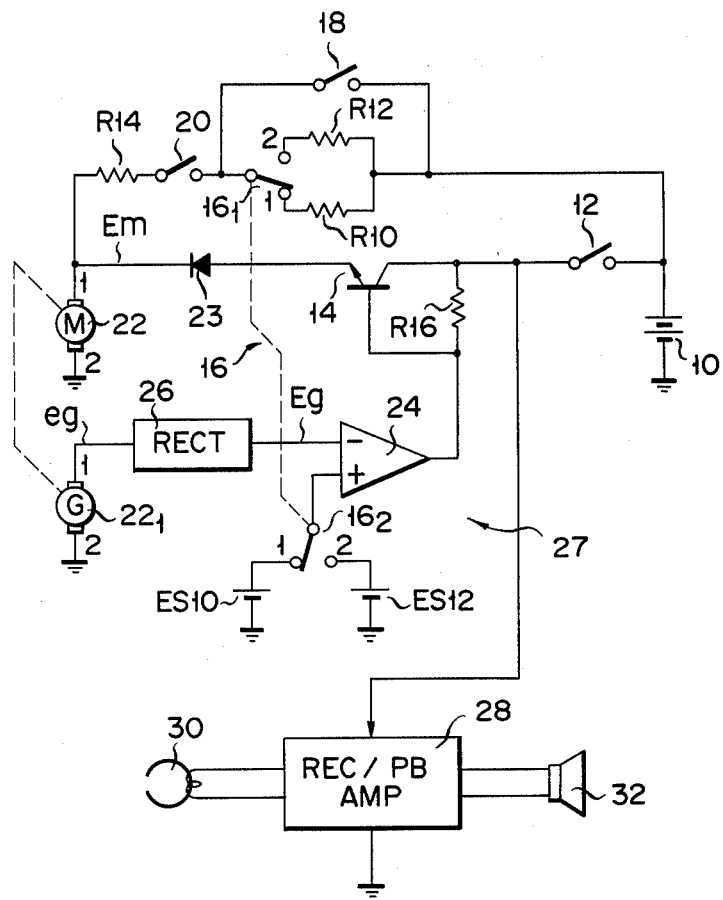
FIG. 1 shows the arrangement of a tape run speed-changing circuit embodying this invention.

Referring to FIG. 1, the positive pole of a power source 10 is connected to the collector of a speed-control NPN transistor 14 through a first switch 12. The negative pole of the power source 10 is grounded. The positive pole of the power source 10 is connected to the first and second contacts of a first tape run speed-changing switch $16_1$ through the corresponding resistors R10, R12. The contactor of the tape run speed-changing switch $16_1$ is connected to the positive pole of the power source 10 through a second switch 18. The contactor of said tape run speed-changing switch $16_1$ is also connected to one end of a motor 22 through a third switch 20 and resistor R14. The other end of the motor 22 is grounded.

Said one end of the motor 22 is connected to the emitter of the transistor 14 through a diode 23. The base of the transistor 14 is connected to its own collector through a resistor R16. The base of the transistor 14 is further connected to the output terminal of an amplifier 24. The inverted input terminal of the amplifier 24 is connected to one end of a frequency generator $22_1$ through a rectifier 26. The other end of the frequency generator $22_1$ is grounded. Said frequency generator $22_1$ is coupled to the motor 22. In other words, the frequency generator $22_1$ produces an AC voltage eg proportional to the running speed of the motor 22. The AC voltage eg is rectified by a rectifier 26 to be converted into a D.C. voltage Eg conforming to the running speed of the motor 22.

A noninverted input terminal of the amplifier 24 is connected to the contactor of a second tape run speed-changing switch $16_2$. The first and second contacts of said second tape run speed-changing switch $16_2$ are respectively connected to the positive poles of a first referential voltage ES10 and second referential voltage ES12. The negative poles of said first and second referential voltages ES10, ES12 are grounded. The switches $16_1$, $16_2$ jointly constitute a 2-gangs 2-contacts tape run speed-changing switch system 16.

The foregoing description refers to the arrangement of a motor included in a tape transport system (not shown) and motor-driving electric circuit. FIG. 1 indicates a record-playback amplifier system 28. This amplifier system 28 is supplied with power from the power source 10 through the first switch 12. The amplifier system 28 is connected to a record-playback head 30 and loudspeaker 32. The record-playback head 30 is used for said purpose, and the amplifier system 28 is actuated as a playback amplifier.

The circuit arranged as shown in FIG. 1 is operated as follows. At the recording or playback mode, the first switch 12 is rendered conducting, while the third switch 20 is thrown out of operation. At this time, the record-playback amplifier system 28 is actuated, and the motor 22 is supplied with power from the emitter of the transistor 14. Now let it be assumed that the switch 16 is operated through the first contact, and the motor 22 is driven at a lower speed than prescribed. In this case the frequency generator $22_1$ sends forth a small output. As a result, the equation of $Eg < ES10$ results. Thus, the amplifier 24 has an increased output terminal potential, causing the motor 22 to be impressed with a higher voltage Em. The more increased the voltage Em, the higher the running speed of the motor 22, and consequently the more elevated the voltage Eg. In the case of $Eg > ES10$, an output voltage from the amplifier 24 drops. As a result, the voltage Em falls to reduce the running speed of the motor 22. Eventually, the running speed of the motor 22 is stabilized at $Eg = ES10$, that is, at the prescribed level. The elements 14, 22, 24, 26, R16, ES10 and ES12 collectively constitute a motor servo circuit 27. When the switch 16 is operated through the second contact, then the motor 22 is driven at a speed expressed as $Eg = ES12$. When a tape recorder is a 2-speeds type in which recording and playback can be carried out at tape transport speeds of 1.2 and 2.4 cm/s, then the voltage ES10 is made to correspond to the tape transport speed of 1.2 cm/s and the voltage ES12 is made to conform to the tape transport speed of 2.4 cm/s.

At the fast forward or rewind mode, the switch 12 is rendered nonconducting, and the switches 18, 20 are actuated. At this time, the motor 22 is supplied with power from the power source 10 through the switches 18, 20 and resistor R14. At this time, the motor servo circuit 27 and record-playback amplifier system 28 are not supplied with power, but are thrown out of operation. In other words, the motor 22 is driven at a high speed substantially proportional to the magnitude of the voltage Em. Therefore, the loudspeaker 32 does not produce sounds. A tape run at the FF or REW mode can be controlled by the resistor R14.

At the cue or review mode, the switches 12, 20 are rendered conducting and the switch 18 is thrown out of operation. Where the switch 16 is operated through the first contact, then the motor 22 is supplied with power from the power source 10 through the resistors R10, R14. At this time, the motor 22 is driven at a speed several times higher than a tape run speed of 1.2 cm/s, that is, a speed of, for example, 3.6 to 4.8 cm/s. The rotating speed of the motor 22 is controlled by changing, for example, the resistance of the resistor R10. At this time the equation $Eg > ES10$ results, leading to a decline in the potential of the output terminal of the amplifier 24. Thus, the diode 23 is biased backward and cut off, giving rise to the breakage of a servo loop. Therefore, even when the switch 12 is rendered conducting, the motor servo circuit 27 is not actuated. At this time, however, the amplifier system 28 is supplied with power. At the cue or review mode, the record-playback head 30 slidably touches a recorded tape (not shown), thereby setting the amplifier system 28 for the playback mode. In other words, the cue or review mode is carried out at a speed several times higher than a tape run speed of, for example, 1.2 cm/s for the recording mode.

When the switch 16 is operated through the second contact, then the motor 22 is supplied with power from the power source 10 through the resistors R12, R14. At this time, the motor 22 is driven at a speed several times higher than a tape run speed of 2.4 cm/s, that is, a speed of, for example, 7.2 to 9.5 cm/s. At this time, the rotating speed of the motor 22 is controlled by changing the resistance of the resistor R12.

As is apparent from the foregoing description, where the resistors R10, R12 have their resistances adjusted to a proper level, then the cue or review mode is carried out while a tape is run at a speed increased in the prescribed ratio over a tape run speed of 1.2 or 2.4 cm/s for the recording or playback mode. The change of a tape run speed for the cue or review mode in the specified ratio to that for the recording or playback mode is automatically carried out by the interlocking 2-gangs 2-contacts switch system 16. Therefore, it is unnecessary to change a tape run speed for the cue or playback mode each time in the specified ratio to the speed at which a tape was originally run for the recording or playback mode.

Figure 2:
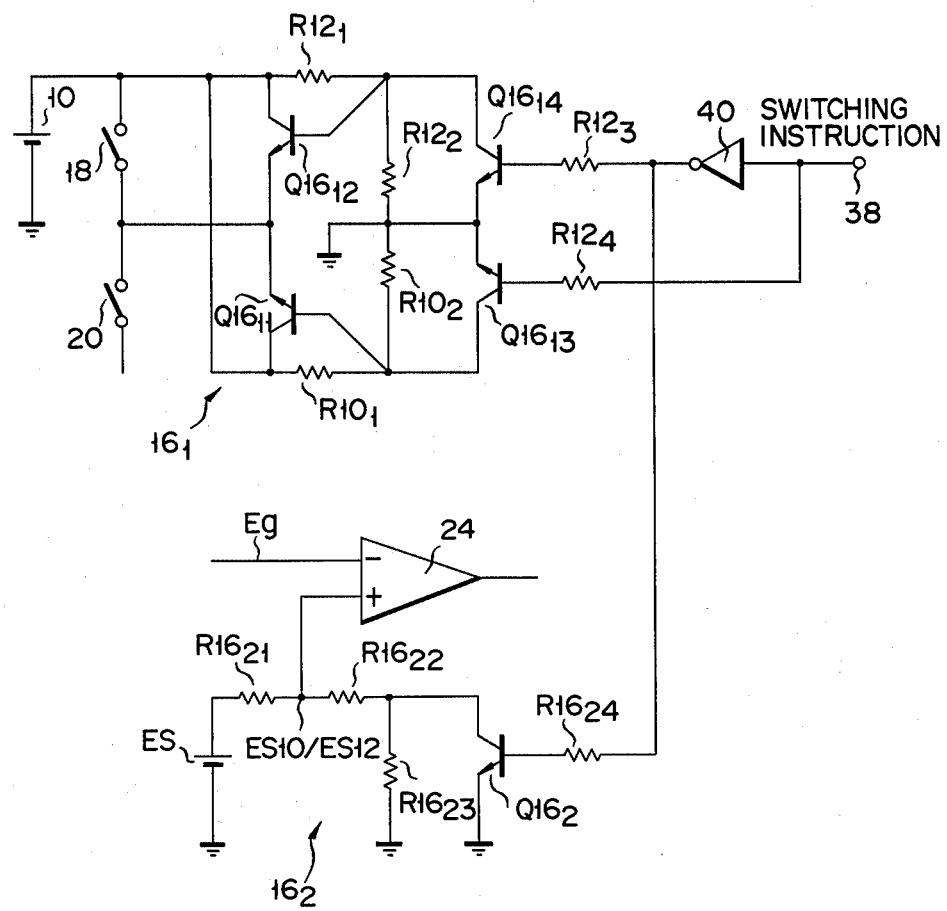
FIG. 2 indicates the arrangement of a modification of said circuit in which the mechanical switch 16 of FIG. 1 is replaced by a semiconductor switch.

FIG. 2 shows the arrangement of a modification of the tape run speed-changing circuit of FIG. 1. In this modification, the switches $16_1$, $16_2$ are replaced by electrical switch circuits. In other words, a logic signal having a level of "1" is supplied as a switching instruction to an input terminal 38 in the timing in which the tape run speed-changing switch system 16 is operated through the second contact instead of the first contact. At this time, an inverter 40 produces a signal having a logic level of "0". As a result, an NPN transistor $Q16_{13}$ is rendered conducting, and NPN transistors $Q16_{14}$, $Q16_2$ are unactuated. Therefore, the motor 22 is supplied through the switch 20 with a second voltage higher than a first voltage defined by resistors $R10_1$, $R10_2$. The level of said second voltage is determined by resistors $R12_1$, $R12_2$. A voltage impressed on the noninverted input terminal of the amplifier 24 has its level raised from ES10 to ES12. This state arises from the fact that when the transistor $Q16_2$ is rendered nonconducting, an increase takes place in the ratio of $(R16_{22}+R16_{23})/(R16_{21}+R16_{22}+R16_{23})$ of a voltage divider formed of resistors $R16_{21}$, $R16_{22}$, $R16_{23}$. Conversely, where the transistor $Q16_2$ is rendered conducting, the dividing ratio of said voltage divider is reduced to $R16_{22}/(R16_{21}+R16_{22})$ defined by the resistors $R16_{21}$, $R16_{22}$. As a result, the noninverted input terminal of the amplifier 24 has its potential set at ES10 (ES10 < ES12).

Figure 3:
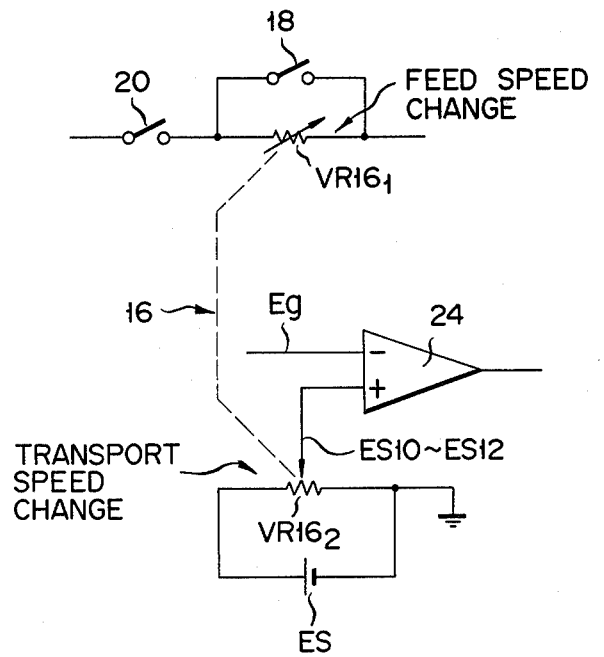
FIG. 3 schematically shows a circuit for continuously changing a tape run speed for the recording or playback mode (hereinafter referred to as "a tape transport speed") and a tape run speed for the cue and review mode (hereinafter referred to as "a tape feed speed"), with the ratio between both speeds fixed.

FIG. 3 shows the arrangement of a modification of FIGS. 1 and 2 indicating a circuit applied to effect a change between two prescribed tape run speeds for the recording or playback mode. FIG. 3 shows the arrangement by which it is continuously carried out to change a tape feed speed for the cue or review mode from 4.8 to 9.5 cm/s in the specified ratio to a tape transport speed of 1.2 to 2.4 cm/s for the recording or playback mode. The gang property of variable resistors $VR16_1$, $VR16_2$ is so trimmed that a tape feed speed for the cue or review mode bears a specified ratio to that for the recording or playback mode, regardless of the position of a slider attached to each of said variable resistors VR16₁, VR16₂.

Although specific constructions have been illustrated and described herein, it is not intended that the invention be limited to the elements and constructions disclosed. One skilled in the art will recognize that other particular elements or sub-constructions may be used without departing from the scope and spirit of the invention. The motor servo circuit 27 for driving, for example, the motor 22 of FIG. 1 may be replaced by the ordinary electronic governor. The switches 12, 16, 18, 20 need not be of the mechanical type. Further, these switches 12, 16, 18, 20 may be formed of a combination of a transistor switch and semiconductor logic circuit like those shown in FIG. 2 or replaced by a relay circuit in part or in whole. A tape recorder to which the tape run speed-changing circuit of this invention is applied may be of the multi-speed type in which a tape may be run at three or more different speeds for the recording or playback mode.

What is claimed is:

1. A tape run speed-changing circuit for a tape recorder having recording, playback, cue and review modes of operation, which comprises:

a motor selectively driveable at a speed conforming to any of at least fist and second different tape run speeds for the recording or playback mode of the tape recorder and also selectively driveable at a respective different cue or review tape run speed matching each of said at least first and second tape run speeds of said recording or playback mode during operation in said cue or review mode of the tape recorder, said first and second tape run speeds of said recording or playback mode and said respective different cue or review tape run speeds being all different from each other, said cue or review tape run speeds being higher than said recording or playback tape run speeds, said first and second tape run speeds bearing respective ratios with the cue or review tape run speeds which respectively correspond to said first and second tape run speeds;

a first settable tape run speed-changing means coupled to said motor for setting any of said different tape run speed for said cue or review mode; and a second settable tape run speed-changing means coupled to said motor and to said first tape run speed changing means for setting either of said first and second tape run speeds for said recording or playback mode different from said tape run speeds for said cue and review modes, and for setting the tape run speed for said recording or playback mode interlockingly with the operation of said first tape run speed-changing means such that said first tape run speed-changing means is responsive to settings of said first second tape run speed-changing means; and means coupled to said first and second tape run speed-changing means for controlling said motor such that when said second tape run speed-changing means sets said first tape run speed for said recording or playback mode, then said first tape run speed-changing means sets a first tape run speed for said cue or review mode different from said first tape run speed of said recording or playback mode; and when said second tape run speed-changing means sets said second tape run speed for said recording or playback mode, then said first tape run speed-changing means sets a second tape run speed for said cue or review mode different from said first and second tape run speeds of said recording or playback mode and also different from said first tape run speed of said cue or review mode.

2. The tape run speed-changing circuit according to claim 1, wherein a first ratio which the first tape run speed for the cue or review mode bears to the first tape run speed for the recording or playback mode is substantially equal to a second ratio which the second tape run speed for the cue or review mode bears to the second tape run speed for the recording or playback mode.

3. The tape run speed-changing circuit according to claim 1, wherein the first and second speed-changing means include 2-gangs 2-contacts type mechanical switches.

4. The tape run speed-changing circuit according to claim 2, wherein at least one of the first and second speed-changing means includes a semi-conductor switch.

5. The tape run speed-changing circuit according to claim 2, wherein the first and second speed-changing means respectively include a 2-gang type variable resistor device formed of first and second variable resistors coupling drive power to said motor; said first variable resistor being coupled to said motor to continuously change the drive power to said motor to continuously change the tape run speed for the cue or review mode between first and second speed levels; and said second variable resistor being coupled to said motor to continuously change the drive power to said motor to continuously change the tape run speed for the recording or playback mode between first and second speed levels.

* * * * *